(12) United States Patent
Abdelrazik et al.

(10) Patent No.: US 12,273,067 B2
(45) Date of Patent: Apr. 8, 2025

(54) HYBRID PHOTOVOLTAIC THERMAL SYSTEM WITH FLEXIBLE ARRANGEMENTS OF SPECTRAL SPLITTING OPTICAL FILTRATION AND THERMAL MANAGEMENT UTILITIES

(71) Applicant: KING FAHD UNIVERSITY OF PETROLEUM AND MINERALS, Dhahran (SA)

(72) Inventors: Ahmed Samir Abdelrazik, Dhahran (SA); Fahad Abdulaziz Alsulaiman, Dhahran (SA); Saidur Rahman, Dhahran (SA)

(73) Assignee: KING FAHD UNIVERSITY OF PETROLEUM AND MINERALS, Dhahran (SA)

(*) Notice: Subject to any disclaimer, the term of this patent is extended or adjusted under 35 U.S.C. 154(b) by 41 days.

(21) Appl. No.: 18/174,209

(22) Filed: Feb. 24, 2023

(65) Prior Publication Data

US 2024/0291425 A1    Aug. 29, 2024

(51) Int. Cl.
*H02S 40/20* (2014.01)
*F24S 80/20* (2018.01)
(Continued)

(52) U.S. Cl.
CPC .............. *H02S 40/20* (2014.12); *F24S 80/20* (2018.05); *F28D 20/021* (2013.01); *H02S 10/20* (2014.12);
(Continued)

(58) Field of Classification Search
None
See application file for complete search history.

(56) References Cited

U.S. PATENT DOCUMENTS

2018/0269828 A1* 9/2018 Beck ............... H02S 40/425
2020/0052646 A1* 2/2020 Fischer ............ H02S 20/23
(Continued)

FOREIGN PATENT DOCUMENTS

CN    100391012 C    5/2008
CN    107911079 A    4/2018
(Continued)

OTHER PUBLICATIONS

Machine translation of CN114370711A (Year: 2022).*
Junkosha Inc. ; Cosmoflex R600 Heat-Resistance Flexible Clean Hose ; 4 Pages.

*Primary Examiner* — Ryan S Cannon
(74) *Attorney, Agent, or Firm* — Oblon, McClelland, Maier & Neustadt, L.L.P.

(57) ABSTRACT

A hybrid photovoltaic thermal (PVT) system including flexible integration of spectral splitting optical filtration and thermal management utilities is described. An optical filtration (OF) channel is provided above a PV panel of the hybrid PVT system, wherein an OF fluid in the OF channel transmits a first light that is within a predefined spectral range and absorbs a second light that is outside the predefined spectral range. A cooling fluid (CF) channel is provided below the PV panel, wherein the CF channel contains a cooling fluid. A phase change material (PCM) layer is provided between the PV panel and the CF channel, wherein at least one of the OF fluid in the OF channel, the cooling fluid in the CF channel, or the PCM layer contains nanoparticles.

7 Claims, 12 Drawing Sheets

(51) Int. Cl.
    *F28D 20/02*         (2006.01)
    *H02S 10/20*         (2014.01)
    *H02S 40/42*         (2014.01)
    *H02S 50/15*         (2014.01)
    *F24S 10/70*         (2018.01)

(52) U.S. Cl.
    CPC ............ *H02S 40/425* (2014.12); *H02S 50/15*
                    (2014.12); *F24S 10/70* (2018.05)

(56)                    References Cited

U.S. PATENT DOCUMENTS

2024/0066471 A1* 2/2024 Qu ..................... H01L 31/0525
2024/0072725 A1* 2/2024 Qu ..................... H02S 40/425

FOREIGN PATENT DOCUMENTS

CN          109114827 A       1/2019
CN          114370711 A   *   4/2022
WO         2015/120367 A1     8/2015
WO      WO-2019186161 A1  *  10/2019    ............. F24S 10/20

* cited by examiner

HYBRID PHOTOVOLTAIC THERMAL SYSTEM WITH FLEXIBLE ARRANGEMENTS OF SPECTRAL SPLITTING OPTICAL FILTRATION AND THERMAL MANAGEMENT UTILITIES

BACKGROUND

Technical Field

The present disclosure relates generally to photovoltaic systems, and more particularly to hybrid photovoltaic thermal solar harvesting systems.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

In a conventional photovoltaic system, only part of the solar radiation is effectively utilized for power generation, whereas the majority of the solar radiation is not used. Hybrid Photovoltaic Thermal (PVT) collectors are power generation systems that have been developed to better utilize solar radiation in generating usable electrical energy as well as thermal energy. PVT collectors facilitate the generation of usable heat along with solar electricity in a single system, thereby achieving an increased overall efficiency and more effective utilization of the solar spectrum than conventional photovoltaic systems.

One advantageous aspect of the hybrid PVT systems is that the effective harvesting of solar radiation to produce usable heat directly contributes towards cooling the photovoltaic cells of the hybrid PVT system. Cooling the photovoltaic cells assists in maintaining optimal performance thereof in the PVT system. One method to ensure that the PV cells in a PVT system do not become overheated is to ensure that the portion of the solar spectrum that does not contribute to the electrical energy conversion by the PV cells is prevented from reaching the PV cells in the first place.

Different designs exist to avoid unnecessary increases in the PV temperature. However, the direct application of these designs to PVT solar collectors is an emerging field.

CN107911079A describes a hybrid PVT device that includes a solar panel, multiple thermoelectric batteries, and a heat transfer layer. The multiple thermoelectric batteries are evenly arranged in an array between the solar panel and the heat transfer layer. The heat transfer layer includes a spiral coil cooling tube and phase change material. The phase change material is provided outside the spiral coil cooling tube, wherein a nano-fluid flows in the spiral coil cooling tube. Such an arrangement is provided for facilitating the cooling of the PV cells in the PVT device. However, such an arrangement does not disclose any means to ensure that only the portion of the solar spectrum that is usable for electrical energy conversion reaches the PV cells. As such, the PV cells may be exposed to high temperatures due to solar radiation, and the effectiveness of the spiral coil cooling tube and the heat transfer layer may be compromised.

WO2015120367A1 describes solar energy collection systems, methods, and an apparatus, which utilize a split solar spectrum, in which the solar radiation is split into at least a visible band and an infrared band by mirrored reflectors to provide electricity and/or heat. Fins are used to promote the cooling of solar cells. The solar energy collection system, however, fails to describe means for facilitating effective cooling above a radiation-receiving surface of the PV cells or that the cooling means is a water-based filter.

CN109114827A describes a hybrid PVT system that includes a groove light collector, a light filter, a vacuum pipe, a heat absorption coating, a heat transfer fluid pipe, heat-conducting glue, solar batteries, and a cooling pipe. The groove light collector is provided at the bottom side of the hybrid PVT system. The light filter is provided above the groove light collector and separates the solar radiation incident upon the groove light collector into long-wave radiation and short-wave radiation. The vacuum pipe is provided above the light filter and receives the long-wave lights. The vacuum pipe is provided with the heat absorption coating on an internal wall thereof. The heat transfer fluid pipe is provided within the vacuum pipe and facilitates heat exchange with the vacuum pipe. The cooling pipe is provided below the light filter, and the solar batteries are placed on the cooling pipe. The solar batteries are attached to the cooling pipe with heat-conducting glue. The cooling fluid used within the cooling pipe is water. Therefore, the hybrid PVT system fails to describe facilitating effective and efficient cooling above a radiation-receiving surface of the PV cells or that the cooling means is a water-based filter.

CN100391012C describes a concentrating-type hybrid photovoltaic (PV) system for simultaneous production of electrical, thermal, and cooling energy by using total reflection (or conventional) mirrors. With the use of concentrating type PV cells, on which the concentrated solar energy is focused, electrical energy is produced, along with simultaneous production of hot water from the cooling of the PV cells. Overheated oil may also be obtained by partially focusing the solar radiation upon the PV cells, while the rest of the radiation is reflected in a special heating oil focal cavity. Also, with the use of special adsorption heat pumps, which convert the thermal power of the produced low-temperature hot water into cooling power, it is possible for the direct utilization of the produced hot water for air conditioning. However, the concentrating-type hybrid photovoltaic (PV) system does not disclose any means to ensure that only the portion of the solar spectrum that is usable for electrical energy conversion reaches the PV cells. As such, the PV cells may be exposed to high temperatures as a result of solar radiation, which may negatively impact the operational life and overall efficiency of the PV cells.

Each of the aforementioned PVT systems suffer from one or more drawbacks hindering their adoption. Accordingly, it is one object of the present disclosure to provide methods and systems for effectively utilizing the solar spectrum for optimal generation of usable heat and electric power, while ensuring that the PV cells of the PVT system receive only the portion of the solar spectrum usable for electrical energy conversion. Further, there is a need for a hybrid PVT system with a robust cooling mechanism for facilitating the cooling of the PV cells.

SUMMARY

In an exemplary embodiment, the present disclosure relates to a hybrid photovoltaic thermal (PVT) system. The hybrid PVT system comprises a photovoltaic (PV) panel. A spectral-splitting optical filtration (OF) channel is located above the PV panel, wherein the OF channel contains an OF fluid configured to transmit a first spectrum of solar radiation that is within a predefined spectral range which is efficiently converted by the solar cell arrays of the PV panel. The first spectrum of solar radiation is dependent on the type of solar cells used in the PV panel. A second spectrum of solar radiation which produces heat in the PV panel is absorbed in the OF fluid. The second spectrum of solar radiation is outside of the predefined spectral range of the first spectrum. A cooling fluid (CF) channel is located below the PV panel, wherein the CF channel contains a cooling fluid. A phase change material (PCM) layer may be provided between the PV panel and the CF channel, wherein at least one of the OF fluid in the OF channel, the cooling fluid in the CF channel, and the PCM layer contains nanoparticles. Different fluids/nano-enhanced fluids can be used in the OF or CF channels, while PCMs and/or nano-enhanced PCMs can be employed in the PCM layer.

In some embodiments, the CF channel includes a plurality of fins and passages.

In some embodiments, each of the CF channel and the OF channel is configured with sidewalls and the sidewalls are insulated.

In some embodiments, the hybrid PVT system further comprises an OF fluid loop, a CF loop, an OF tank for the OF fluid, a CF tank for the cooling fluid, an OF heat exchanger configured to cool the OF fluid, a first pump configured to pump the OF fluid and a second pump configured to pump the cooling fluid, and a CF heat exchanger configured to cool the cooling fluid.

In some embodiments, an inlet and an outlet of the OF channel are connected to the OF fluid loop.

In some embodiments, an inlet and an outlet of the CF channel are connected to the CF loop.

In some embodiments, the OF fluid in the OF fluid loop passes through the OF tank, the OF channel, and the OF heat exchanger in sequence.

In some embodiments, the cooling fluid in the CF loop passes through the CF tank, the CF channel, and the CF heat exchanger in sequence.

In some embodiments, the OF fluid loop includes a first plurality of flexible hoses configured to connect the OF tank and the OF heat exchanger to an inlet and an outlet of the OF channel, and the CF fluid loop includes a second plurality of flexible hoses configured to connect the CF tank and the CF heat exchanger to an inlet and an outlet of the CF channel.

In some embodiments, the OF heat exchanger and the CF heat exchanger are integrated into a composite heat exchanger which allows for heat rejection from the OF fluid and the cooling fluid through the OF fluid loop and the CF loop, respectively.

In some embodiments, the heights of the OF channel and the CF channel are 1 cm and 2 cm, respectively.

In another exemplary embodiment, the present disclosure relates to a method of testing a hybrid photovoltaic thermal (PVT) system. The method comprises selecting at least one of an optical filtration (OF) fluid or a cooling fluid (CF) to be tested. When the OF fluid is selected, the method includes attaching an OF channel above a photovoltaic (PV) panel of the hybrid PVT system and filling the OF channel with the OF fluid, the OF fluid transmitting a first spectrum of solar radiation that is within a predefined spectral range and absorbing a second spectrum of solar radiation that is outside the predefined spectral range. When the cooling fluid is selected, the method includes attaching a CF channel below the PV panel, filling the CF channel with the cooling fluid, and determining whether the hybrid PVT system should include a phase change material (PCM) layer.

In an aspect in which the hybrid PVT system includes the PCM layer, the method includes inserting the PCM layer between the PV panel and the CF channel, and testing performance of the hybrid PVT system by pumping the OF fluid and the cooling fluid through the OF channel and the CF channel, respectively. The at least one of the OF fluid in the OF channel, the cooling fluid in the CF channel, and the PCM layer contains nanoparticles as needed for thermal and/or optical properties optimization.

The hybrid photovoltaic thermal (PVT) system may be configured to be flexibly integrated with spectral splitting optical filtration and/or thermal management utilities.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
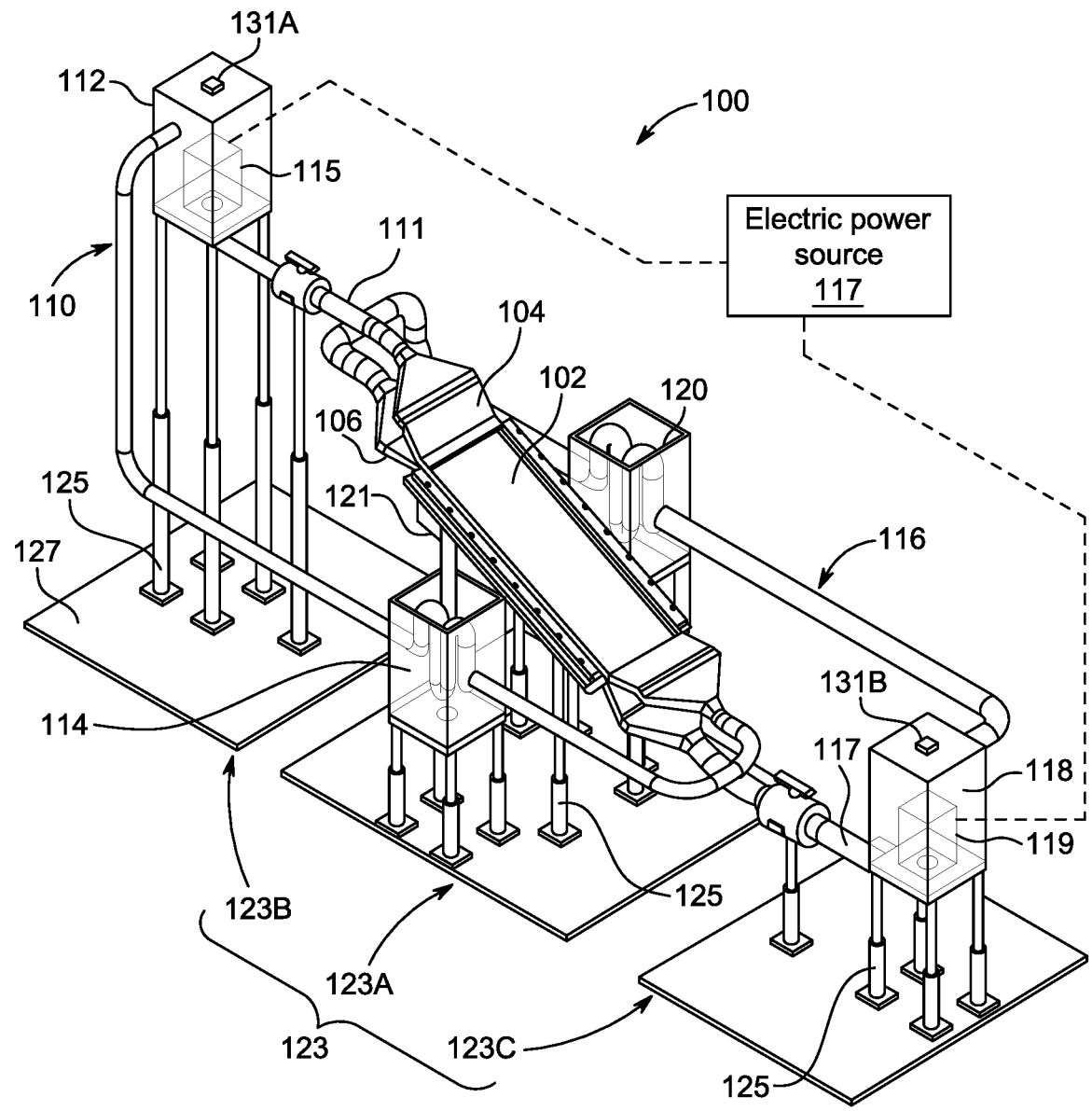
FIG. 1A illustrates a perspective view of a hybrid photovoltaic thermal (PVT) system, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

The present disclosure relates to a hybrid photovoltaic thermal (PVT) system including a photovoltaic (PV) panel. An optical filtration channel is provided above the PV panel. A first fluid in the optical filtration channel transmits a predefined spectral range of incident solar radiation that is within an efficient range for electrical conversion by the PV cells and absorbs the remaining solar radiation that is outside the predefined spectral range. A cooling fluid channel is provided below the PV panel. A phase change material (PCM) layer is provided between the PV panel and the cooling fluid channel. At least one of the first fluid in the optical filtration channel, a second fluid in the cooling fluid channel and the PCM layer contains nanoparticles.

PV panels, in general, have a high efficiency of electrical conversion in the visible light spectrum of 350 nm to 750 nm and in the violet and ultraviolet spectrum up to about 1150 nm. Solar radiation outside of the spectral range of 3500 nm to 1150 nm generates undesirable heat in the PV panel.

FIG. 1A illustrates a perspective view of a hybrid photovoltaic thermal system 100 (also referred to as the hybrid PVT system 100 hereinafter), in accordance with some aspects of the present disclosure. The hybrid PVT system 100 includes a photovoltaic (PV) panel 102. In some aspects of the present disclosure, the PV panel 102 is a flexible PV panel. An optical filtration (OF) channel 104 is provided above the PV panel 102, wherein a spectral splitting optical OF fluid in the OF channel transmits a predefined first spectral range of solar radiation that is within an efficient range for electrical conversion by the PV cells and absorbs a second, remaining spectral range of solar radiation that is outside the predefined spectral range. Heat generated in the PV panel 102 by the second, remaining spectral range of solar radiation is then transported away from the PV panel 102 and cooled by a cooling fluid as described below. The heat absorbed by the cooling fluid may then be used to provide heat to, for example, a water heater, a swimming pool and the like. The OF channel 104 may be a flat hollow component flexibly affixed operatively above the PV panel 102 and which forms a screen which facilitates optical filtration of incident solar radiation via the spectral splitting OF fluid flowing therethrough. When the heat is absorbed by the OF channel 104, it prevents the heat from reaching the PV panel 102, thus preventing the overheating of the PV panel 102. When the PV panel 102 is protected from being overheated, the PV panel 102 is in an optimal condition to operate as close as possible to the rated specifications.

The hybrid PVT system 100 further includes a cooling fluid (CF) channel 106 that is provided below the PV panel 102, wherein the CF channel 106 contains a cooling fluid. The CF channel 106 may be a flat hollow component to be affixed operatively below the PV panel 102 for facilitating cooling of the PV panel 102 at an operative bottom side thereof. In some aspects, the CF channel 106 includes a plurality of fins 106P and passages 106Q (shown in FIG. 4B) for facilitating optimal utilization of the cooling fluid. In some aspects, the CF channel 106 may include a compartment for housing therein a phase change material (PCM) layer 108 (shown in FIG. 5A). More specifically, the PCM layer 108 may be provided between the PV panel 102 and the CF channel 106. In some aspects of the present disclosure, one or more of the OF fluid in the OF channel 104, the cooling fluid in the CF channel 106 and the PCM layer 108 contains nanoparticles. In some aspects, the addition of nano particles in one or more of the OF fluid, the cooling fluid, and the PCM layer 108 facilitates in modifying the optical and thermal properties to meet requirements of the hybrid PVT system 100. For example, thermal and optical properties of the OF fluid, the cooling fluid, and the PCM layer 108 may be selected depending upon various parameters of the hybrid PVT system 100, such as the types of solar cells used in the PV panel 102, the ambient temperature, the sunlight availability, the altitude, and so on.

The hybrid PVT system 100 further includes an OF fluid loop 110 that facilitates a fluid communication between the OF channel 104 and an OF tank 112. The hybrid PVT system 100 further includes an OF heat exchanger 114 disposed along the OF fluid loop 110 operatively between the OF channel 104 and the OF tank 112. The OF fluid loop 110 is formed by fluidly connecting the OF channel 104, OF tank 112, and the OF heat exchanger 114 using multiple flexible hoses 111. The flexible hose 111 may be made of a material which is heat-resistant, corrosion-resistant and chemical-resistant. In an example, the flexible hose 111 may include a fluoropolymer inner wetted layer and a flexible elastomer outer layer that can withstand an operating temperature of up to about 92° C. and an operating pressure of 0.3 to 0.5 MPa, having a lubricious inner layer which is non-adhesive to a majority of substances and any adhering materials can be removed easily, such as the Cosmoflex® R600 heat resistant flexible clean hose, available from Junkosha Inc., Kasama Operations Center, 961-20 Fukuda, Kasama-shi, Ibaraki-ken, Japan 309-1603. Due to the flexible hoses 111, the OF tank 112, the OF heat exchanger 114, and the PV panel 102 can be positioned at a desired height and a desired angle based on the operating requirements of the hybrid PVT system 100. In some aspects of the present disclosure, a first pump 115 may be disposed within the OF tank 112. The first pump 115 may be configured to supply the OF fluid at a desired flow rate through the OF fluid loop 110. In some aspects, the first pump 115 may be disposed at a desired location in the OF fluid loop 110 to facilitate the flow of the OF fluid at the desired flow rate through the OF fluid loop 110. For example, the first pump 115 may be a displacement pump, a centrifugal pump, or the like. Further, the first pump 115 may be in communication with an electric power source 117 to derive the power required for supplying the OF fluid at the desired flow rate. For example, the electric power source 117 may be a battery powered by the PV panel 102 or by an electric power distribution line. In another example, the electric power source 117 may be a generator driven by an engine. During the operation of the hybrid PVT system 100, the OF fluid in the OF fluid loop 110 passes from the OF tank 112, through the OF channel 104, and through the OF heat exchanger 114 in sequence. The OF heat exchanger 114 rejects the heat collected by the OF fluid from absorbing solar radiation in the second spectrum, as mentioned above. The heat rejected by the OF fluid into the OF heat exchanger 114 may be recycled by downstream components.

Similarly, the hybrid PVT system 100 further includes a CF loop 116 that facilitates fluid communication between the CF channel 106 and a CF tank 118. The hybrid PVT system 100 further includes a CF heat exchanger 120 disposed along the CF loop 116 operatively between the CF channel 106 and the CF tank 118. The CF loop 116 is formed by fluidly connecting the CF channel 106, the CF tank 118, and the CF heat exchanger 120 using multiple flexible hoses 113. The flexible hose 113 may be the same type of hose as the flexible hoses 111. With the flexible hoses 113, the CF tank 118, the CF heat exchanger 120, and the PV panel 102 can be positioned at the desired height and the desired angle based on the operating requirements of the hybrid PVT system 100. In some aspects of the present disclosure, a second pump 119 may be disposed within the CF tank 118. The second pump 119 may be configured to supply the cooling fluid at a desired flow rate through the CF loop 116. In some aspects, the second pump 119 may be disposed at a desired location in the CF loop 116 to facilitate the flow of the cooling fluid at the desired flow rate through the CF loop 116. Further, the second pump 119 may be in communication with the electric power source 117 to derive the power required for supplying the cooling fluid at the desired flow rate. During the operation of the hybrid PVT system 100, the cooling fluid in the CF loop 116 passes from the CF tank 118, through the CF channel 106, and through the CF heat exchanger 120 in sequence. The CF heat exchanger 120 facilitates the rejection of heat collected by the cooling fluid during the cooling of the PV panel 102. The heat rejected by the cooling fluid at the CF heat exchanger 120 may further be recycled by downstream components.

In some aspects of the present disclosure, the hybrid PVT system 100 further includes a junction box 121 attached to a bottom side of the PV panel 102. The junction box 121 is configured to electrically attach the PV panel 102 with an external electric device. Particularly, the electrical energy produced by the PV panel 102 from the first spectral range of solar radiation may be transmitted to the external electric device using the junction box 121. In some aspects, the hybrid PVT system 100 may include a metering system configured to monitor various operating parameters thereof. In an aspect of the present disclosure, the metering system may include a first temperature sensor 131A disposed in the OF tank 112 or in the OF fluid loop 110 and a second temperature sensor 131B disposed in the CF tank 118 or in the CF loop 116. The first temperature sensor 131A and the second temperature sensor 131B are configured to detect a temperature of the OF fluid and the cooling fluid flowing through the OF fluid loop 110 and the CF loop 116, respectively. The metering system may further include one or more flow control valves and pressure control valves disposed in the OF fluid loop 110 and the CF loop 116. The metering system may be in communication with the electric power source 117. In some aspects, the metering system may be in communication with a display device to display the operating parameters such as the temperature of the OF fluid and the cooling fluid.

Figure 1B:
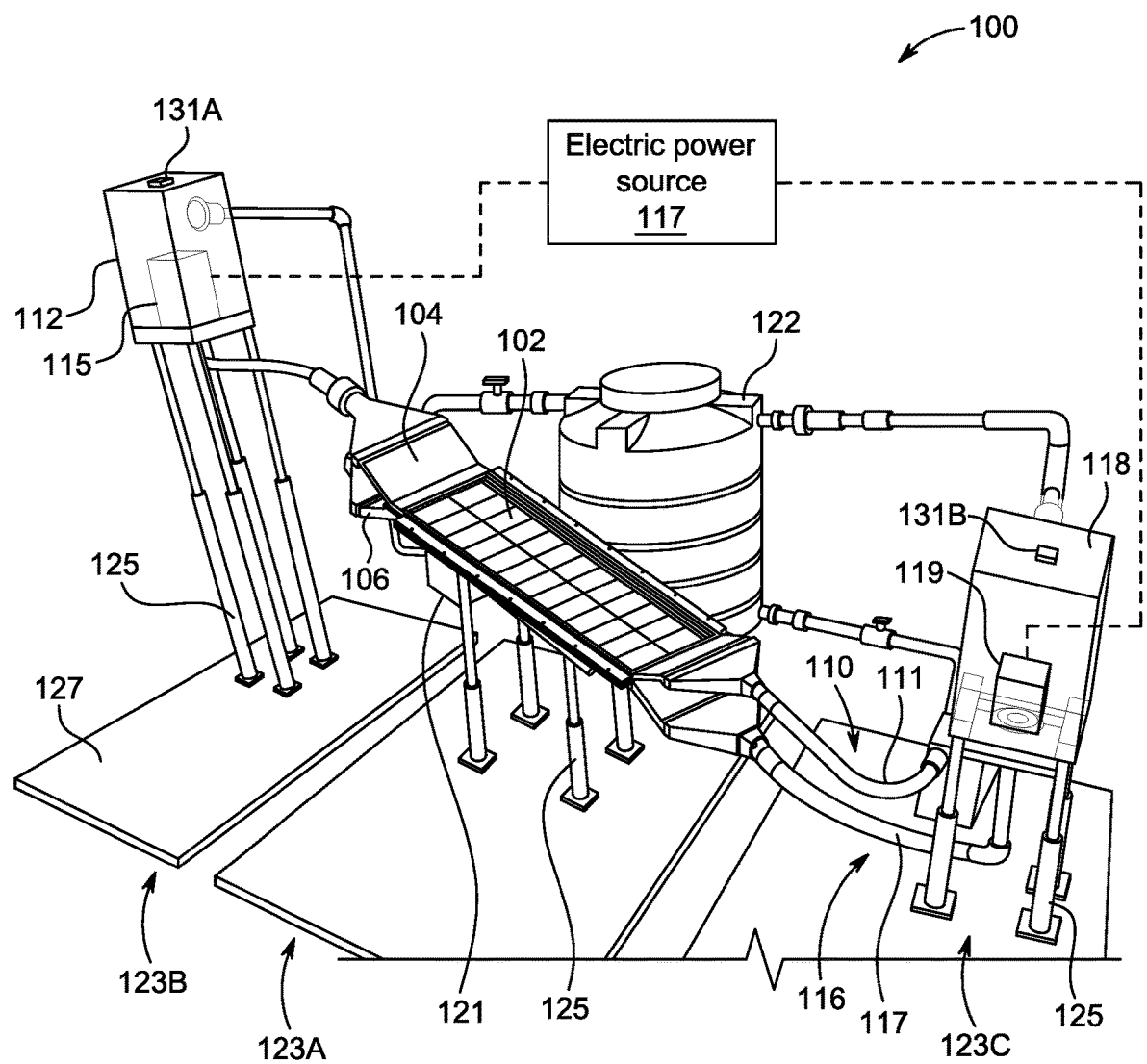
FIG. 1B illustrates a perspective view of an experimental setup of the hybrid photovoltaic thermal system, according to certain embodiments.

In an alternative embodiment of the hybrid PVT system 100 depicted in FIG. 1B, the OF heat exchanger 114 and the CF heat exchanger 120 may be integrated into a composite heat exchanger which allows for heat rejection from the OF fluid and the cooling fluid through the OF fluid loop 110 and the CF loop 116, respectively. As seen in FIG. 1B, the hybrid PVT system 100 includes an integrated heat exchanger 122, wherein the CF loop 116 as well as the OF fluid loop 110 are in fluid communication with the integrated heat exchanger 122. The heat contained in the OF fluid and the cooling fluid is rejected at the integrated heat exchanger 122, wherein the rejected heat may be further utilized for other applications. The integrated heat exchanger 122 has separate internal passages for the CF fluid and the OF fluid to prevent mixing.

Referring back to FIG. 1A, the hybrid PVT system 100 further includes a plurality of base sections 123. In some aspects, the base sections 123 may be designed to be a flexible and expandable system. According to some aspects, the flexible and expandable system refers to the ability of the hybrid PVT system 100 to be modified easily and conveniently owing to the modular configuration of the different components. More specifically, increasing the size of the base section 123 may facilitate the placement of a greater number of PV panels 102 or bigger OF tanks 112, CF tanks 118, and the like. In some aspects, changes in the dimensions of the base sections 123 may allow reception of the incident solar radiation at different angles. For example, the height or the inclination of the hybrid PVT system 100 may be adjusted by increasing the lengths of the base sections 123, thereby allowing the reception of the incident solar radiation at different angles. In some aspects of the present disclosure, the hybrid PVT system 100 includes a first base 123A configured to adjustably support the PV panel 102, the OF heat exchanger 114 and the CF heat exchanger 120, a second base 123B configured to adjustably support the OF tank 112, and a third base 123C configured to adjustably support the CF tank 118. The first base 123A, the second base 123B, and the third base 123C are collectively referred to as 'the base sections 123' and individually referred to as 'the base section 123' unless otherwise specifically mentioned. Each of the plurality of base sections 123 includes a plurality of support bars 125 configured to movably support various elements of the hybrid PVT system 100 at the desired height and the desired angle with respect to a ground surface.

Figure 1C:
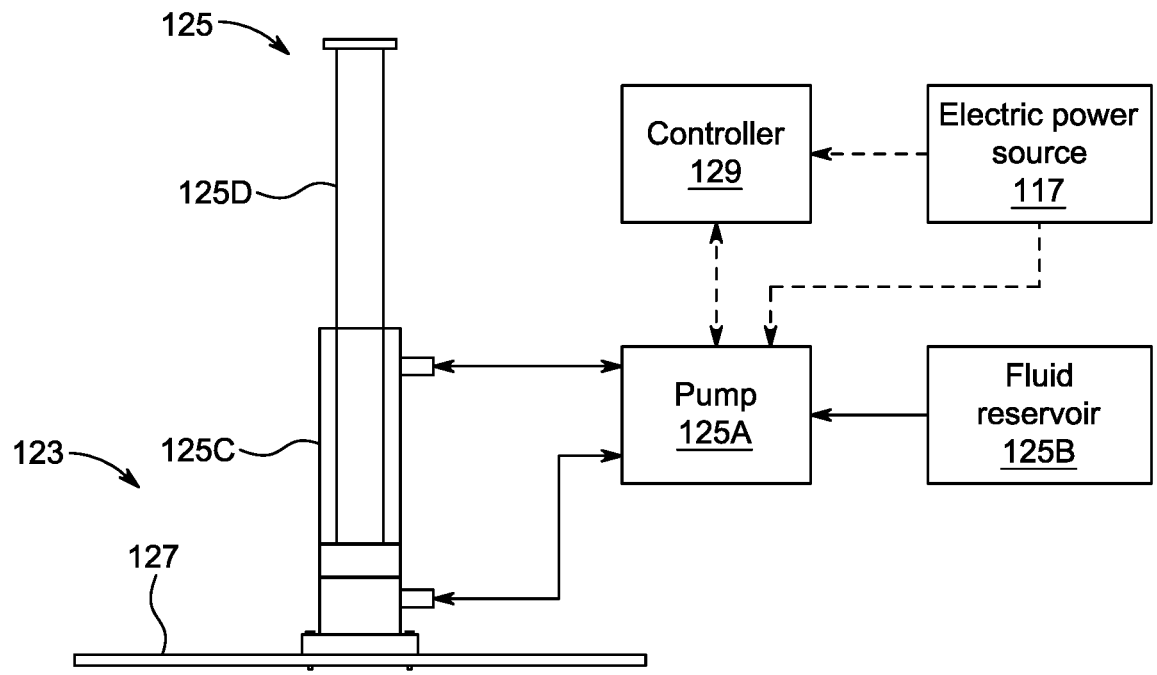
FIG. 1C illustrates a schematic block diagram of a support bar actuated by a hydraulic or a pneumatic system, according to certain embodiments.

Referring to FIG. 1C, a schematic block diagram of the support bar 125 actuated by a hydraulic or a pneumatic system is illustrated, according to one exemplary aspect of the present disclosure. The support bar 125 may be a piston-cylinder arrangement fluidly coupled with a pump 125A, which in turn fluidly communicates with a fluid reservoir 125B. The piston-cylinder arrangement includes a cylinder 125C having a tail end coupled to a top surface of a base plate 127 and a head end movably coupled with a piston 125D. The piston 125D is further coupled to an element of the hybrid PVT system 100. In one example, the piston-cylinder arrangement may be a single-acting cylinder in which the tail end of the cylinder 125C is fluidly communicated with the fluid reservoir 125B via the pump 125A. As such, a forward movement of the piston 125D relative to the cylinder 125C is controlled by the pump 125A and a backward movement of the piston 125D relative to the cylinder 125C is facilitated by a compression spring. In another example, as shown in FIG. 1C, the piston-cylinder arrangement may be a double-acting cylinder in which the tail end and the head end of the cylinder 125C is fluidly communicated with the fluid reservoir 125B, as such both the forward and backward movement of the piston 125D relative to the cylinder 125C is controlled by the pump 125A. In an aspect of the present disclosure in which a hydraulic system is used as the power source, the fluid reservoir 125B may be a tank containing an oil to actuate the movement of the piston 125D relative to the cylinder 125C, and the pump 125A may electrically communicate with a controller 129 to control the movement of the piston 125D relative to the cylinder 125C based on inputs from a user. The controller 129 may communicate with the electric power source 117 to receive power therefrom for the operation thereof. In the case of a pneumatic system having a power source, the fluid reservoir 125B may be a source of compressed air to actuate the movement of the piston 125D relative to the cylinder 125C and the pump 125A may electrically communicate with the controller 129 to control the movement of the piston 125D.

Figure 1D:
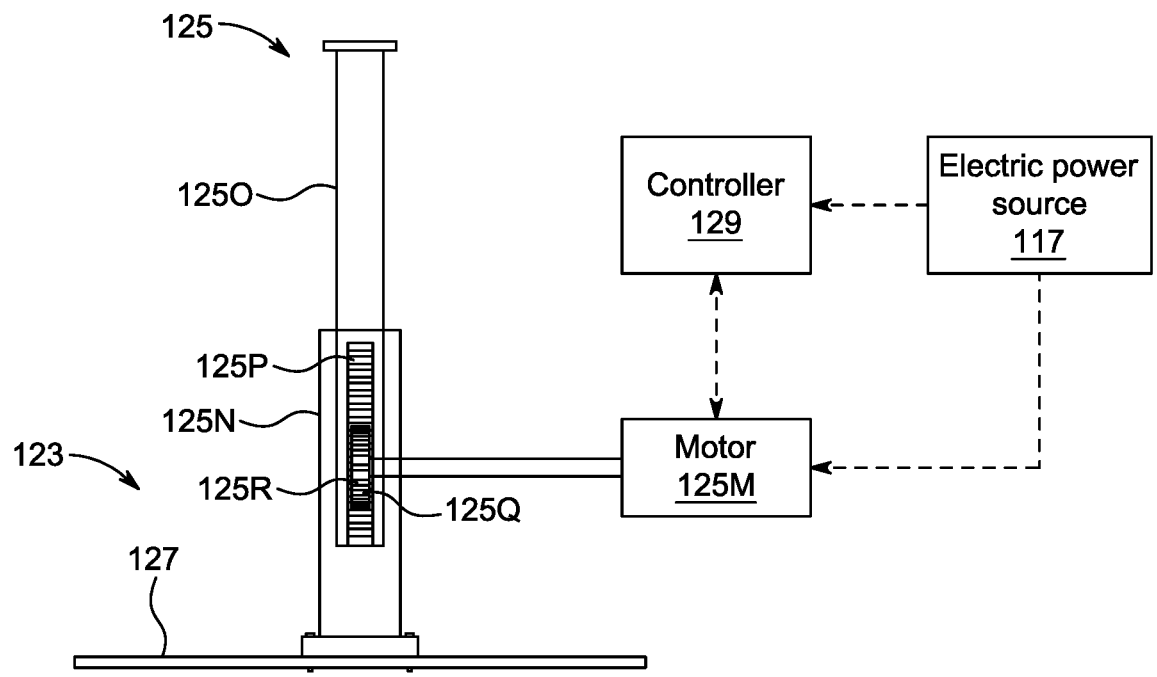
FIG. 1D illustrates a schematic block diagram of a support bar actuated by an electric system, according to certain embodiments.

Referring to FIG. 1D, a schematic block diagram of the support bar 125 actuated by an electric system is illustrated, according to another exemplary aspect of the present disclosure. In this aspect, the support bar 125 may be a worm gear and wheel arrangement electrically coupled with a motor 125M, which in turn communicates with the electric power source 117. The support bar 125 includes an elongated sleeve 125N configured to slidably receive a telescopic rod 125O therein. One end of the telescopic rod 125O includes a plurality of teeth 125P and one end is received within the elongated sleeve 125N and another end is configured to couple with an element of the hybrid PVT system 100. The support bar 125 further includes a wheel 125Q having a plurality of teeth 125R which is rotatably supported on the elongated sleeve 125N and engages with the plurality of teeth 125P of the elongated sleeve 125N. The wheel 125Q is further connected to the motor 125M to receive rotary power therefrom. Accordingly, the support bars 125 are made adjustable to movably couple various elements of the hybrid PVT system 100 to the base plate 127. With the adjustable configuration of the support bars 125 and the flexible hoses 111, 113, the height of the OF tank 112 and the CF tank 118 are adjusted based on the height and the inclination of the PV panel 102. The flexibles hoses 111, 113 bend without breaking while the PV panel 102, the OF tank 112, and the CF tank 118 are adjusted. In some aspects, each of the plurality of support bars 125 is individually controlled by the hydraulic, pneumatic, or the electric system based on the inputs received from the user through the controller 129. In other aspects, the controller 129 may include a maximum power point tracker (MPPT) which adjusts the hybrid photovoltaic thermal (PVT) system according to the intensity of incident solar radiation falling on the device, as measured by a light meter (not shown).

Figure 2:
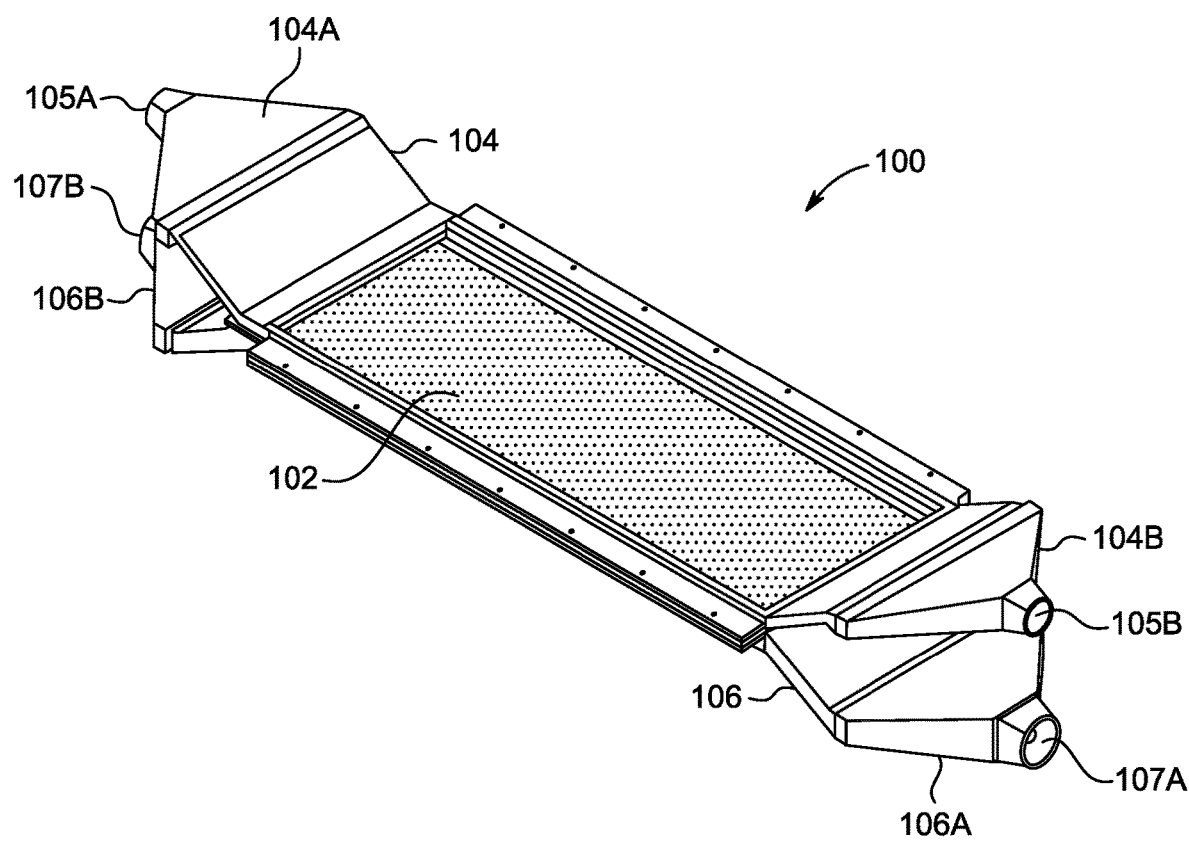
FIG. 2 illustrates a perspective view of an assembly of a PV panel, a cooling fluid (CF) channel, and an optical filtration (OF) channel used in the hybrid PVT system, according to certain embodiments.

FIG. 2 illustrates a perspective view of an assembly of the PV panel 102, the CF channel 106, and the OF channel 104 used in the hybrid PVT system 100, in accordance with some aspects of the present disclosure. As seen in FIG. 2, the PV panel 102 is sandwiched between the CF channel 106 and the OF channel 104. The OF channel 104 includes a first connector 104A and a second connector 104B extending from the operative ends of the OF channel 104. In some aspects, the first connector 104A and the second connector 104B may be integral with the OF channel 104. In some aspects, the first connector 104A and the second connector 104B may be discreet components that may be assembled on the operative ends of the OF channel 104. The first connector 104A and the second connector 104B facilitate the connection of the OF channel 104 with the OF fluid loop 110, as seen in FIG. 1A. The first connector 104A defines a first opening 105A for connection of the OF fluid loop 110 thereon to allow the OF fluid from the OF tank 112 to be introduced into the OF channel 104. The second connector 104B defines a second opening 105B for connection of the OF fluid loop 110 thereon to allow the OF fluid to exit from the OF channel 104 to the OF heat exchanger 114 disposed downstream of the OF channel 104.

The CF channel 106 also includes a first connector 106A and a second connector 106B extending from the operative ends of the CF channel 106. In some aspects, the first connector 106A and the second connector 106B may be integral with the CF channel 106. In some aspects, the first connector 106A and the second connector 106B may be discreet components that may be assembled on the operative ends of the CF channel 106. The first connector 106A and the second connector 106B facilitate the connection of the CF channel 106 with the CF loop 116, as seen in FIG. 1A. The first connector 106A defines a first opening 107A for connection of the CF loop 116 thereon to allow the cooling fluid from the CF tank 118 to be introduced into the CF channel 106. The second connector 106B defines a second opening 107B for connection of the CF loop 116 thereon to allow the cooling fluid to exit from the CF channel 106 to the CF heat exchanger 120 disposed downstream of the CF channel 106.

Figure 3:
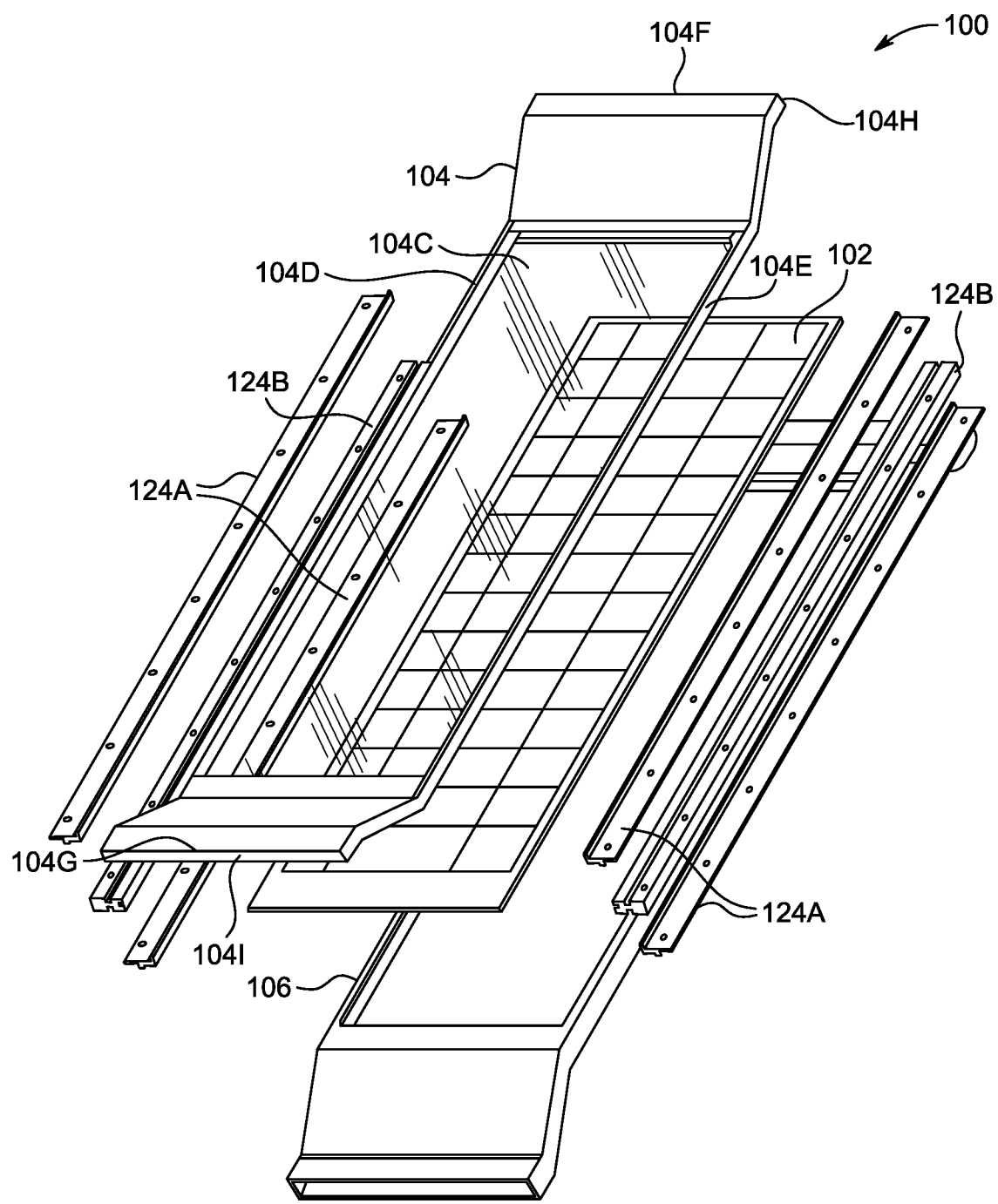
FIG. 3 illustrates an exploded view of the assembly of the PV panel, the CF channel, and the OF channel used in the hybrid PVT system, according to certain embodiments.

FIG. 3 illustrates an exploded view of the assembly of the PV panel 102, the CF channel 106, and the OF channel 104 used in the hybrid PVT system 100, in accordance with some aspects of the present disclosure. As seen in FIG. 3, the PV panel 102 is provided operatively below the OF channel 104. The OF channel 104 defines a screen 104C. In some aspects, the screen 104C may be made of a high transmittance glass. The OF channel 104, in certain aspects, has a rectangular cross-section and further includes sidewalls 104D and 104E that are insulated. The OF channel 104 further defines a first operative end 104F and a second operative end 104G. The first operative end 104F defines a rectangular opening, wherein the rectangular opening may be configured to function as inlet 104H of the OF channel 104. Similarly, the second operative end 104G defines another rectangular opening, wherein the rectangular opening may be configured to function as an outlet 104I of the OF channel 104. Referring to FIGS. 2 and 3, the first connector 104A defines the first opening 105A for connection of the OF fluid loop 110 thereon to allow the OF fluid from the OF tank 112 to be introduced into the OF channel 104, wherein the first connector 104A is configured to be assembled over the inlet 104H. The second connector 104B defines the second opening 105B for connection of the OF fluid loop 110 thereon to allow the OF fluid to exit the OF channel 104, wherein the second connector 104B is configured to be assembled over the outlet 104I. In some aspects, water is used as the OF fluid due to its high transmittance. In some aspects, nanoparticles may be dispersed in the water to form a nanofluid, wherein the nanoparticles may be selected as per application requirements for controlling the optical properties of the OF channel 104. In some aspects, the optical properties of the nanofluid (OF fluid) should facilitate transmittance of only the useful spectral range for the electrical energy conversion towards the PV panel 102, while the remaining solar spectrum is absorbed in the optical nanofluid (OF fluid). The useful spectrum ranges depend on the type of PV cells. Several types exist, such as the m-Si, p-Si, a-Si, GaAs, CdTe, CIGS, and perovskite. For the m-Si and p-Si cells, for example, the electrically-efficient spectral range is ~350-

1150 nm, while it is ~300-800 nm for the perovskite cell. The nanomaterial type and concentration that should be dispersed in the OF base fluid should be selected based on the operating PV cells and the targeted application. Low concentrations are normally preferred for general higher transmittance. For example, an OF fluid composed of the core-shell silver-silica (Ag—SiO2) nanomaterial dispersed in water matches the efficient spectrum of p-Si PV cells.

Figure 4A:
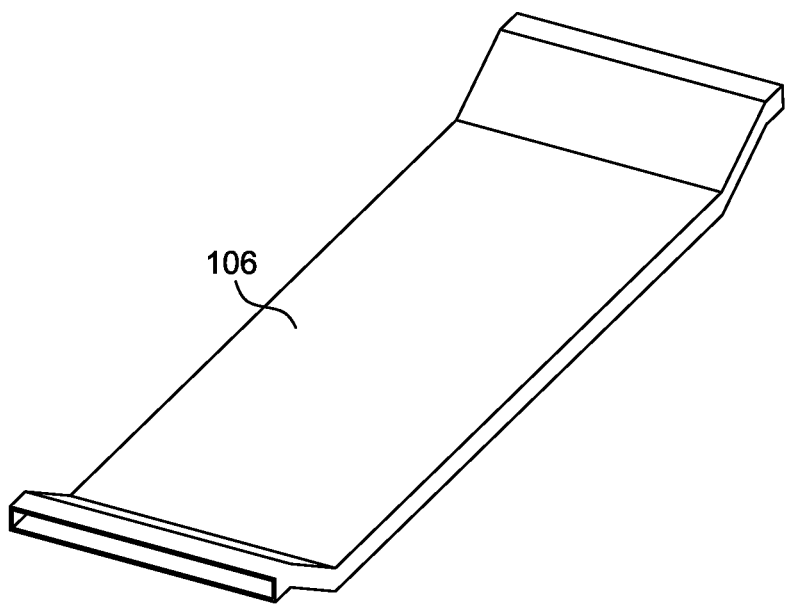
FIG. 4A illustrates a perspective view of the channel used in the hybrid PVT system, according to certain embodiments.
Figure 4B:
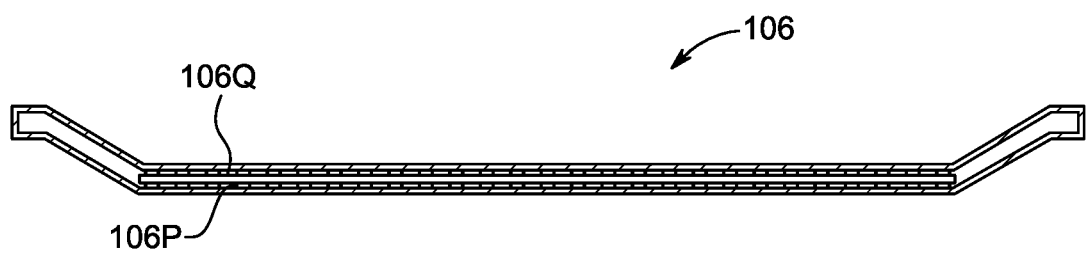
FIG. 4B illustrates a side view of the channel of FIG. 4A, according to certain embodiments.
Figure 5A:
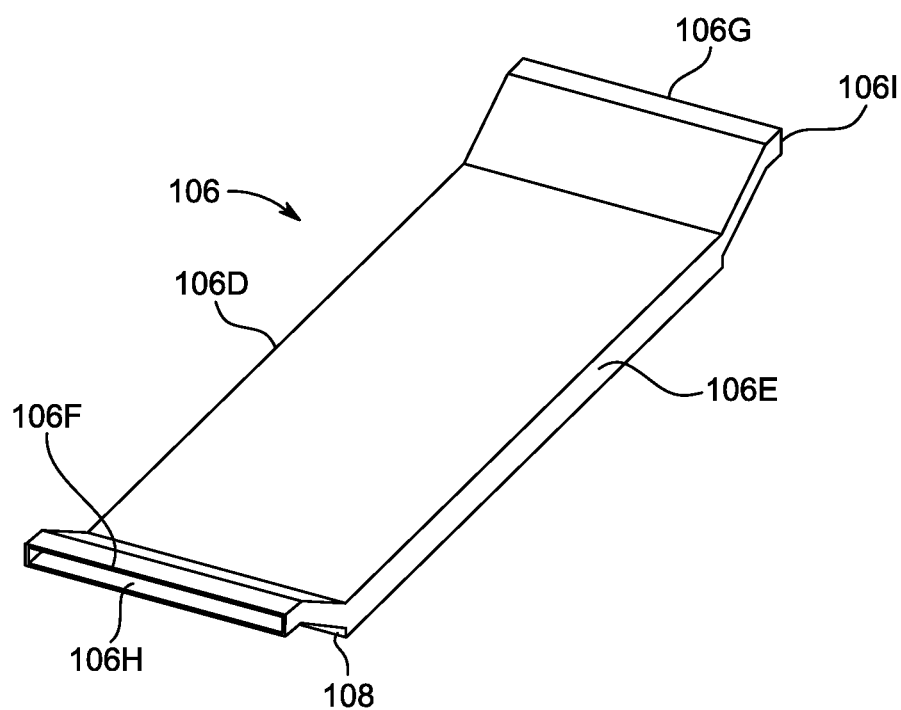
FIG. 5A illustrates a perspective view of a CF channel having a phase change material (PCM) layer, according to certain embodiments.
Figure 5B:
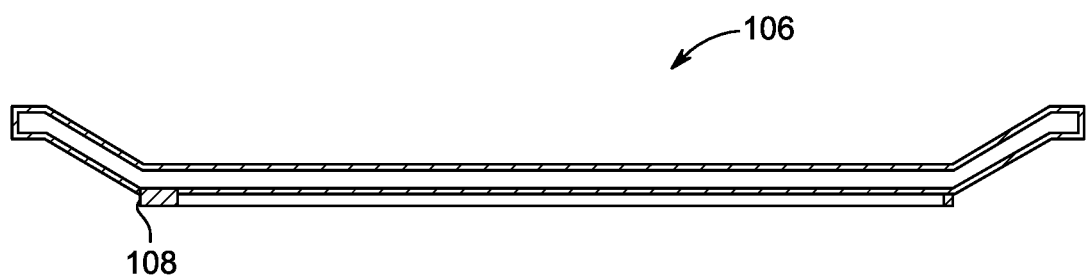
FIG. 5B illustrates a side view of the CF channel of FIG. 5A, according to certain embodiments.

The CF channel 106 is provided operatively below the PV panel 102. The CF channel 106 is configured to provide cooling to the back side of the PV panel 102. The present disclosure envisages two different configurations of the CF channel 106. More specifically, in some aspects, the CF channel 106, as depicted in FIG. 4A and FIG. 4B, may not include the PCM layer 108. The CF channel 106 may further include the fins 106P and the passages 106Q, schematically shown in FIG. 4B, for enhancing the heat rejection capacity of the CF channel 106. In one example, the passages 106Q may extend along a length of the CF channel 106, and the fins 106P may extend along a width of the CF channel 106. In another example, the fins 106P may extend along the length of the CF channel 106 and the passages 106Q may extend along the width of the CF channel 106. Such cross arrangement of the fins 106P and the passages 106Q may improve the heat rejection capacity of the CF channel 106. In some aspects, as depicted in FIG. 5A and FIG. 5B, the CF channel 106 includes the PCM layer 108, wherein the PCM layer 108 is configured to interface with the operative bottom surface of the PV panel 102. An advantageous aspect of placing the PCM layer 108 between the PV panel 102 and the CF channel 106 is that the use of the PCM layer 108 between the PV panel 102 and the CF channel 106 serves for enhancement of the thermal regulation of the temperature distribution along the PV panel 102, in addition to the benefit of thermal energy storage. The PCM layer 108 is designed to consume significant quantities of latent heat over a relatively small temperature range. Therefore, if there is ample thermal contact between the PCM layer 108 and the PV panel 102, the PCM layer 108 can keep the PV panel 102 at near-constant temperature as the PCM layer 108 absorbs heat from the PV panel 102. In some aspects, the PCM layer 108 includes dispersed nanoparticles with specific thermal properties for enhancing the thermal properties thereof.

Carbon-based nanomaterials are a preferred additive to improve the thermal properties, specifically the thermal conductivity, of PCMs. In particular, multi-walled carbon nanotubes (MWCNTs) and graphene nanoplatelets (GNPs) are nanomaterials which are particularly effective when added to the PCM material. Their thermal impact is dependent on the base PCM itself. However, high nanomaterial concentrations (≥10 wt. %) are necessary.

The solar radiation spectrum includes the ultraviolet, visible and infrared wavelengths. Of the light that reaches Earth's surface, infrared radiation makes up 49.4% of while visible light provides 42.3% 9. Ultraviolet radiation makes up just over 8% of the total solar radiation. Part of the second, remaining spectrum of solar radiation which causes undesirable heating in the PV panel includes the infrared spectrum, in the range of 700 nm to 1 mm. Visible light makes up most of the light that hits the Earth and has a higher energy concentration than infrared (which also makes up a significant portion of light that comes to Earth). Photons from ultraviolet light have too much energy, although they can still create electrical flow, but much of the energy is wasted as heat. This heat warms the panels, which decreases their efficiency. Therefore, the majority of solar panels are made of materials that convert primarily visible light.

Aspects of the present disclosure describe selecting the optical properties of the nanofluid to filter the light impinging on the PV panels to transmit primarily visible light, while absorbing heat by blocking light in the ultraviolet and infrared spectrums. Additionally, as PV panels are manufactured to operate at highest efficiency at spectral ranges within the visible light spectrum. In general, s solar panels are designed to absorb light in the visible spectrum. The band-gap of a solar panel is usually between 400 nm and 1100 nm. The most common type of solar panel has a band gap of about 850 nm.

The most common type of solar panel is made from crystalline silicon. This type of solar panel has a band gap of around 850 nm. There are other panels made from thin-film solar cells. Thin-film solar cells are made from materials such as cadmium telluride, copper indium gallium selenide, and amorphous silicon. These materials have band gaps that range from 400 nm to 1100 nm. This means that thin-film solar cells can absorb a wider range of wavelengths than crystalline silicon solar cells. Solar panel size also affects the wavelength of light that it can use. Smaller solar panels have a smaller band-gap, which means that they can only absorb shorter wavelengths of light. The presence of impurities in the solar panel material can also affect the wavelength of light that it can absorb. For example, if a solar panel is made from crystalline silicon that has been doped with boron, the band gap will be shifted to shorter wavelengths. The band-gap of a solar panel can also change with temperature. For example, the band-gap of crystalline silicon increases as the temperature decreases. This means that solar panels will be less effective at absorbing light at higher temperatures. Therefore, the OF fluid must be carefully selected to pass a spectral range which matches the type of solar panel used. The addition of nanoparticles to the OF fluid can change the optical properties of the OF fluid. Therefore, nanoparticle concentrations in the OF fluid can be tailored to the particular type of PV panel used. The nanoparticles in the OF fluid may be any one of core-shell silver-silica (Ag—SiO2) nanoparticles, carbon nanoparticles, titanium dioxide nanoparticles, silver nanoparticles, platinum nanoparticles, a combination of gold nanospheres and nanorods and indium tin oxide (ITO) nanocrystals, and combinations thereof.

The cooling fluid may be any one of water, oil, polypropylene glycol, polydimethyl siloxane based oil, and the like. The nanoparticles may be composed of indium tin oxide and gold nanospheres for below bandgap and high energy absorption respectively, carbon nanoparticles, gold nanoparticles, and the like. The nanoparticles are suspended in the cooling fluid. In an example, the concentration of nanoparticles in either or both the OF fluid and the cooling fluid may be controlled by an algorithm in the controller 129 which causes the release of nanoparticles into the respective fluid in order to tailor the nanoparticle concentration depending on the amount of light impinging on the PV panel.

As seen in FIG. 5A, the CF channel 106, in certain aspects, has a rectangular cross-section and further includes sidewalls 106D, 106E that are insulated. The CF channel 106 further defines a first operative end 106F and a second operative end 106G. The first operative end 106F defines a rectangular opening, wherein the rectangular opening may be configured to function as inlet 106H of the CF channel 106. Similarly, the second operative end 106G defines another rectangular opening, wherein the rectangular opening may be configured to function as an outlet 106I of the CF channel 106. Referring to FIG. 3, the first connector 106A defines the first opening 107A for allowing connection of the CF loop 116 thereon for allowing the cooling fluid from the CF tank 118 to be introduced into the CF channel 106, wherein the first connector 106A is configured to be assembled over the inlet 106H. The second connector 106B defines the second opening 107B for allowing connection of the CF loop 116 thereon for allowing the cooling fluid to exit the CF channel 106, wherein the second connector 106B is configured to be assembled over the outlet 106I.

In some aspects, the CF channel 106 facilitates the cooling of the PV panel 102 from the back side of the PV panel 102. In one embodiment, the CF channel 106 is made from a highly conductive material, while sidewalls 106D, 106E thereof may be insulated. In another embodiment, the cooling fluid channel 106 may include the fins 106P and the passages 106Q for enhancing the heat rejection from the PV panel 102. The heat rejected from the PV panel 102 is collected by the cooling fluid. Increasing the amount of heat collected by the cooling fluid is one of the functions of the hybrid PVT system 100, in accordance with some aspects of the present disclosure. In some aspects, the cooling fluid may be a nanofluid instead of a traditional cooling fluid.

Figure 6A:
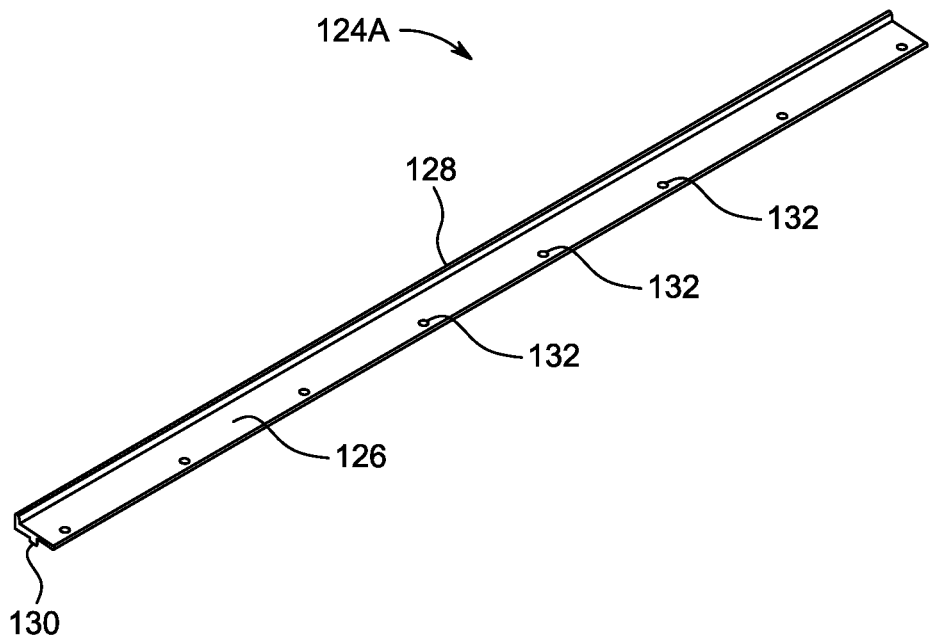
FIG. 6A illustrates a perspective view of a first coupling unit used in the hybrid PVT system, according to certain embodiments.
Figure 6B:
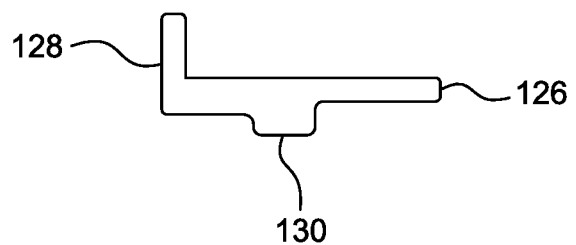
FIG. 6B illustrates a side view of the first coupling unit of FIG. 6A, according to certain embodiments.

Referring again to FIG. 3, the assembly of the PV panel 102, the OF channel 104, and the CF channel 106 is facilitated via first coupling units 124A and second coupling units 124B. FIG. 6A and FIG. 6B illustrate different views of the first coupling unit 124A for assembling the OF channel 104, the PV panel 102, and the CF channel 106, in accordance with some aspects of the present disclosure. Referring to FIG. 6A and FIG. 6B, the first coupling unit 124A is an L-section defined by a base 126 and an upright wall 128. The first coupling unit 124A further includes a protrusion 130 extending from the base 126 in a direction opposite to that of the upright wall 128. The first coupling unit 124A is configured to hold the OF channel 104 and the CF channel 106. More specifically, one pair of first coupling units 124A may hold the OF channel 104 between the upright walls 128 of the pair of first coupling units 124A. Similarly, another pair of first coupling units 124A may hold the CF channel 106 between the upright walls 128 of the pair of first coupling units 124A. In some aspects, the first coupling unit 124A may be made of a thermal insulator material for facilitating insulation of sidewalls of the OF channel 104 and the CF channel 106 held therebetween. The thermal insulator material may be selected from mineral wool, fiberglass, polystyrene foam, cellulose paper fiber, polyurethane foam and the like. In some aspects, the first coupling unit 124A further comprises a first plurality of apertures 132 defined on the base 126 and distributed along a longitudinal axis of the base 126.

Figure 7A:
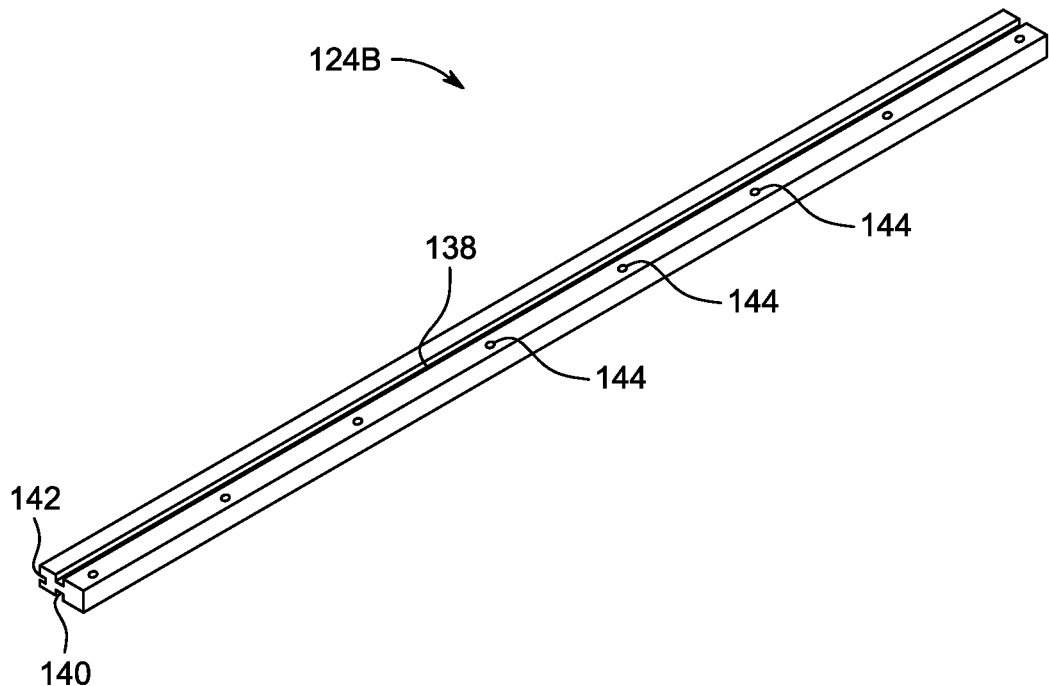
FIG. 7A illustrates a perspective view of a second coupling unit used in the hybrid PVT system, according to certain embodiments.
Figure 7B:
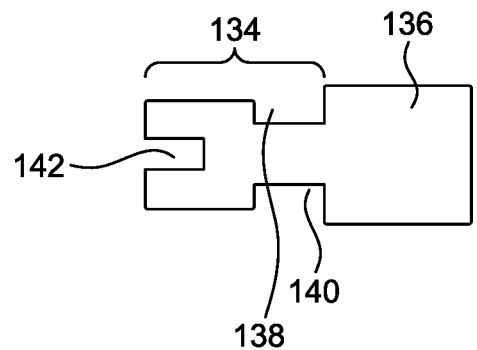
FIG. 7B illustrates a side view of the second coupling unit of FIG. 7A, according to certain embodiments.

FIG. 7A and FIG. 7B illustrate different views of the second coupling unit 124B for assembling the OF channel 104, the PV panel 102, and the CF channel 106, in accordance with some aspects of the present disclosure. Referring to FIG. 7A and FIG. 7B, the second coupling unit 124B defines a first base section 134 and a second base section 136. The first base section 134 of the second coupling unit 124B includes a first protrusion receiving slot 138, a second protrusion receiving slot 140, and a lateral slot 142. The second base section 136 extends from the first base section 134 and includes a second plurality of apertures 144.

In an assembled configuration, the first protrusion receiving slot 138 may be configured to receive the protrusions 130 of the first coupling units 124A that are holding the OF channel 104 therebetween. The second protrusion receiving slot 140 may be configured to receive the protrusions 130 of the first coupling units 124A that are holding the CF channel 106 therebetween. Once the OF channel 104 and the CF channel 106 are assembled on the second coupling unit 124B, the fitment may be secured by fasteners such as nuts and screws. In the assembled configuration, the base 126 of the first coupling unit 124A is placed on the second base section 136 of the of the second coupling unit 124B in a manner that the first plurality of apertures 132 are aligned with the second plurality of apertures 144 for facilitating the reception of fasteners therein, in accordance with some aspects. Once the assembly of the OF channel 104 and the CF channel 106 is performed, a space is formed operatively between the OF channel 104 and the CF channel 106, wherein the PV panel 102 may be placed. The placement of the PV panel 102 between the OF channel 104 and the CF channel 106 is facilitated by the lateral slot 142 defined on the second coupling unit 124B.

Figure 8A:
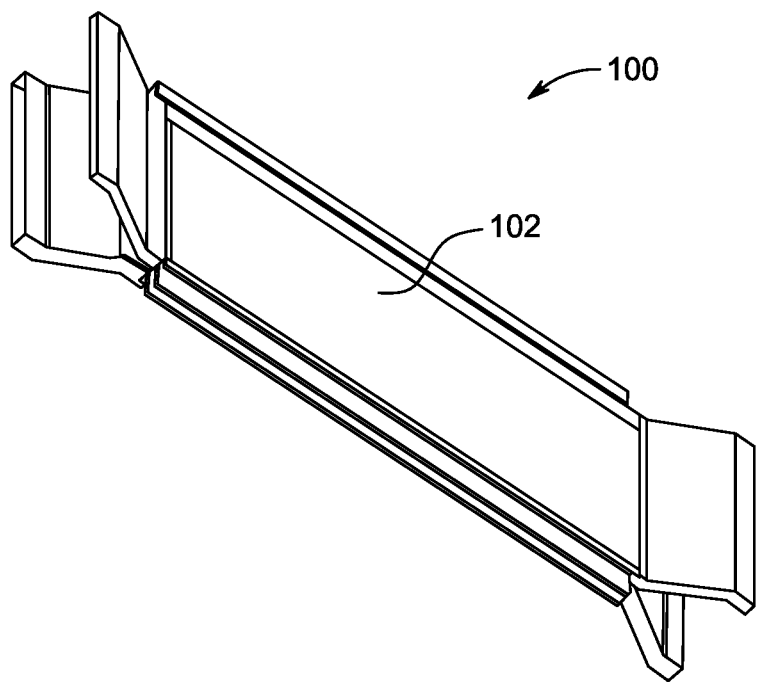
FIG. 8A illustrates a perspective view of the hybrid PVT system depicting the placement of the PV panel between the CF channel and the OF channel, according to certain embodiments.
Figure 8B:
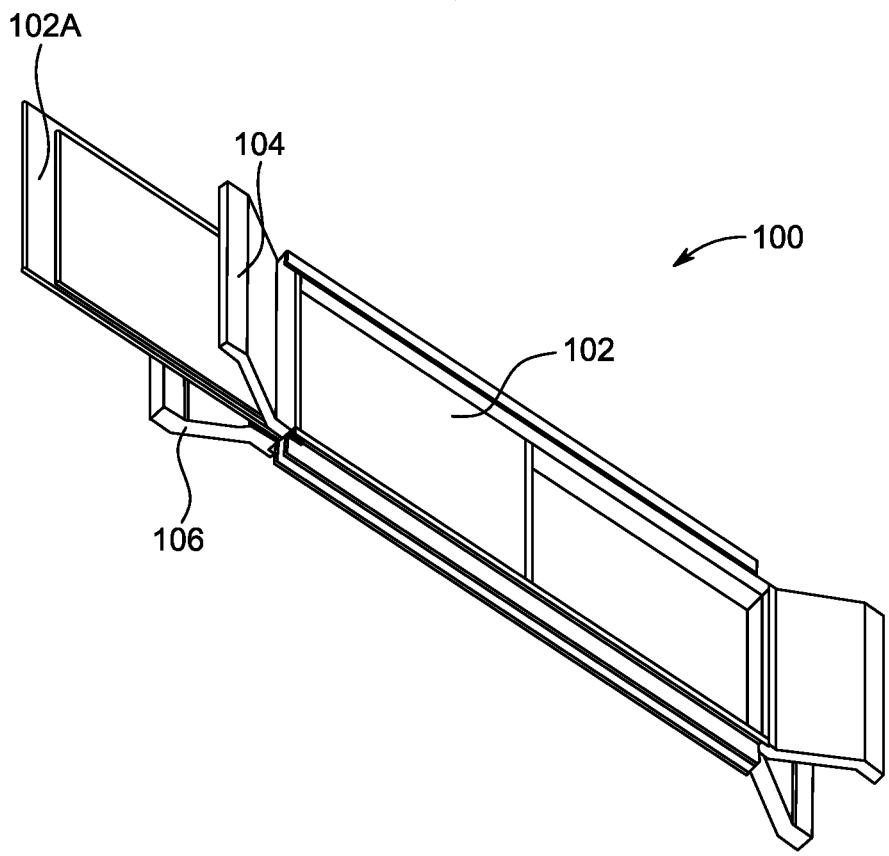
FIG. 8B illustrates another perspective view of the hybrid PVT system of FIG. 8A depicting a sliding movement of the PV panel in between the CF channel and the OF channel, according to certain embodiments.

FIG. 8A and FIG. 8B illustrate perspective views depicting the ease of placement of the PV panel 102 in between the CF channel 106 and the OF channel 104, in accordance with some aspects of the present disclosure. The flexible configuration of the PV panel 102 facilitates a placement of the PV panel 102 in a frame 102A for allowing a user to easily push the PV panel 102 in place between the OF channel 104 and the CF channel 106 and into the lateral slot 142. In certain aspects, the PV panel 102 may be a flexible panel that can be pushed into the lateral slot 142 without the use of the frame 102A.

Figure 9A:
FIG. 9A illustrates a side view of a hybrid PVT system having only the OF channel or CF channel, according to certain embodiments.
Figure 9B:
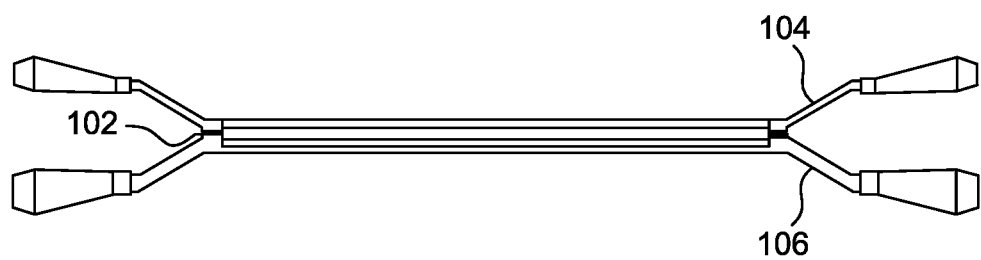
FIG. 9B illustrates a side view of a hybrid PVT system including the OF channel and the CF channel, according to certain embodiments.
Figure 9C:
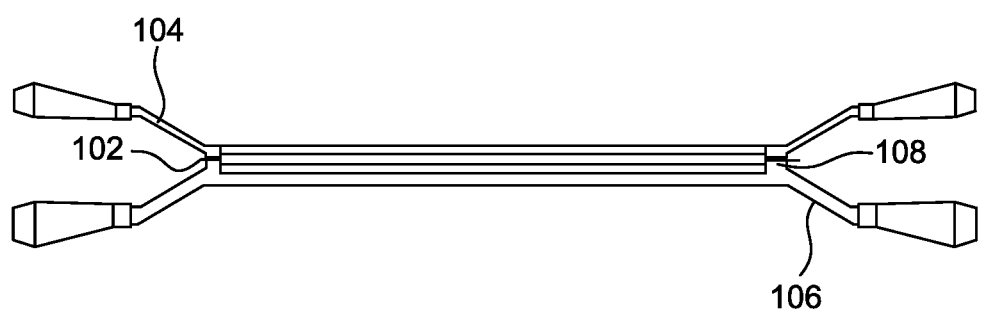
FIG. 9C illustrates a side view of a hybrid PVT system including the OF channel, the PCM layer, and the CF channel, according to certain embodiments.

FIG. 9A through FIG. 9C illustrate different operational configurations of the hybrid PVT system 100, in accordance with some aspects of the present disclosure. Referring to FIG. 9A, this configuration of the hybrid PVT system 100 only includes the CF channel 106 and does not include the OF channel 104. An exemplary application of such aspects of the hybrid PVT system 100 may be in cool places, where there is very little chance of the PV panel 102 being overheated as a result of incident solar radiation. Referring to FIG. 9B, this configuration of the hybrid PVT system 100 includes the OF channel 104 as well as the CF channel 106. Referring to FIG. 9C, this configuration of the hybrid PVT system 100 includes the OF channel 104, the CF channel 106, as well as the PCM layer 108. The aspects illustrated in FIG. 9B and FIG. 9C may find applications in hot regions, where it is essential to maintain the operating temperature of the PV panel 102 within a pre-defined temperature range for ensuring that the PV panel 102 has a long operational life and operates as close as possible to its rated specifications.

The hybrid PVT system 100 has a modular and flexible configuration. More specifically, the hybrid PVT system 100 may be designed as per specific application requirements by conveniently adding or removing one or more components. For example, the hybrid PVT system 100 may have a configuration that may include just the CF channel 106, wherein such a configuration may be appropriate for low-temperature regions where the ambient temperature is such that there is very little possibility of overheating of the PV panel 102. Achieving such a configuration of the hybrid PVT system 100 does not require any special manufacturing modifications to the existing design. Such a convenient and modular design may also allow for the testing of different nanoparticles for application in the OF fluid, the cooling fluid, and the PCM layer 108. Therefore, one exemplary application of the hybrid PVT system 100 may be its usage as an experimental setup for testing out thermal and optical properties of different nanoparticles or other materials. As such, the present disclosure also envisages a method of performing testing of the hybrid PVT system 100.

Figure 10:
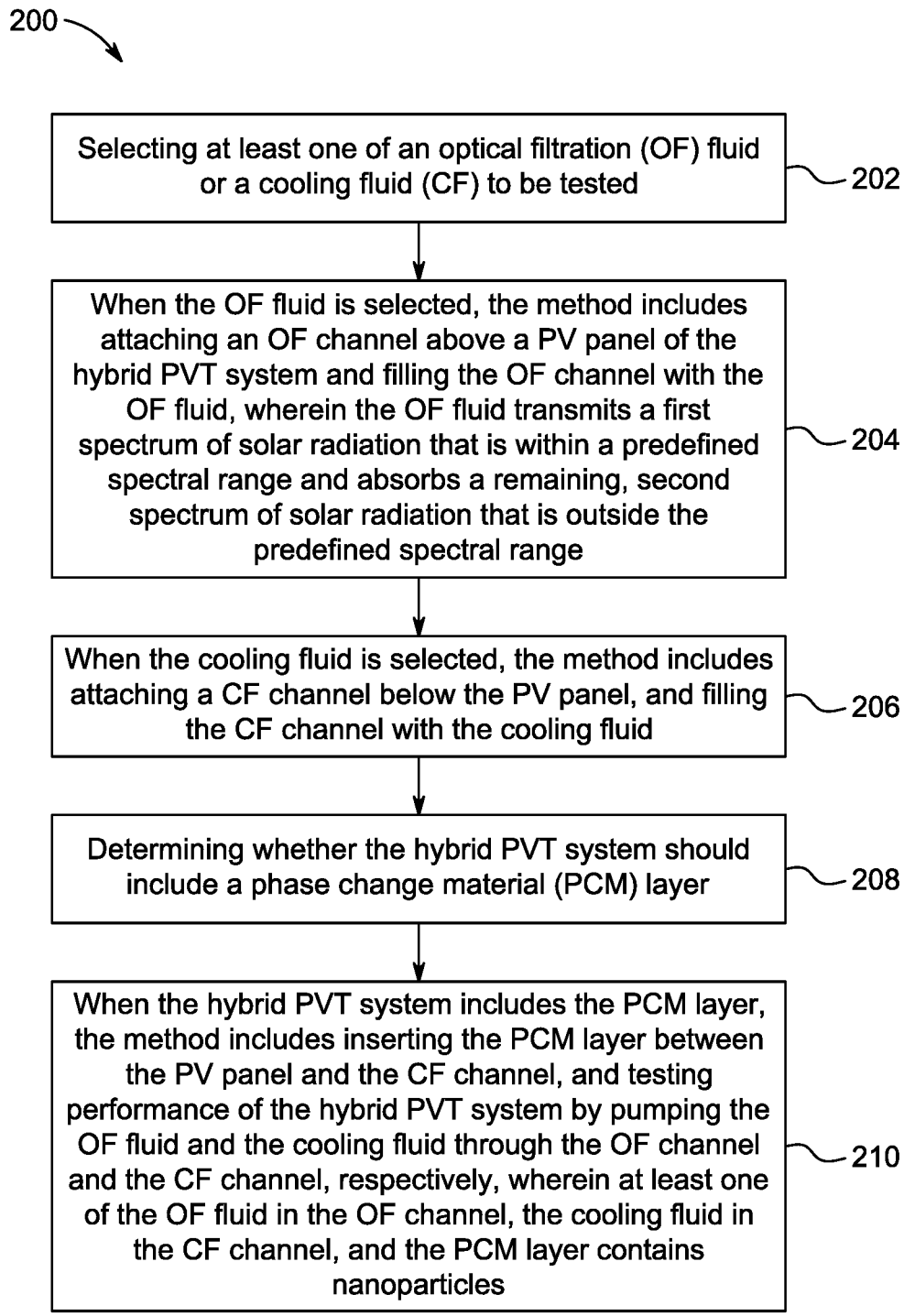
FIG. 10 illustrates a flow diagram of a method of performing testing of the hybrid PVT system, according to certain embodiments.

FIG. 10 illustrates a block diagram depicting a method 200 of performing testing of the hybrid PVT system 100, in accordance with some aspects of the present disclosure. At step 202, the method 200 includes selecting at least one of the optical filtration (OF) fluid or the cooling fluid (CF) to be tested. More specifically, the hybrid PVT system 100, according to some aspects of the present disclosure, facilitates testing of any of the OF fluids, the cooling fluids, and combinations of the OF fluid and the cooling fluid.

At step 204, when the OF fluid is selected, the method 200 includes attaching the OF channel 104 above the photovoltaic (PV) panel 102 of the hybrid PVT system 100 and filling the OF channel 104 with the OF fluid, wherein the OF fluid transmits a first spectrum of solar radiation that is within a predefined spectral range and absorbs a second spectrum of solar radiation that is outside the predefined spectral range. Thus, the OF channel 104 facilitates the transmission of a spectrum of incident solar radiation that is usable for electrical energy conversion, whereas the remaining spectrum of solar radiation is absorbed by the OF fluid. In some aspects, the PV panel 102 is supported between the pair of second coupling units 124B, and the attachment of the OF channel 104 above the PV panel 102 is facilitated by the pair of first coupling units 124A. More specifically, the OF channel 104 may be held between upright walls 128 of the first coupling units 124A. The first coupling unit 124A is configured for fitment on the second coupling unit 124B, thereby facilitating attachment of the OF channel 104 above the PV panel 102.

At step 206, when the cooling fluid is selected, the method 200 includes attaching the CF channel 106 below the PV panel 102 and filling the CF channel 106 with the cooling fluid. In some aspects, the attachment of the CF channel 106 below the PV panel 102 is facilitated by another pair of first coupling units 124A. More specifically, the CF channel 106 may be held between the upright walls 128 of the first coupling units 124A, wherein the first coupling units 124A may be then attached to the second coupling units 124B that hold the PV panel 102 therebetween, thereby facilitating attachment of the CF channel 106 below the PV panel 102.

At step 208, the method 200 further includes determining whether the hybrid PVT system 100 should include the phase change material (PCM) layer 108. Some aspects of the CF channel 106 include a slot for accommodating the PCM layer 108.

At step 210, when the hybrid PVT system 100 includes the PCM layer 108, the method 200 includes inserting the PCM layer 108 between the PV panel 102 and the CF channel 106, and testing performance of the hybrid PVT system 100 by pumping the OF fluid and the cooling fluid through the OF channel 104 and the CF channel 106, respectively, wherein at least one of the OF fluid in the OF channel 104, the cooling fluid in the CF channel 106, or the PCM layer 108 contains nanoparticles. In some aspects, the method 200 includes testing the OF fluid in the OF channel 104, the cooling fluid in the CF channel 106, or the PCM layer 108 for assessing their thermal and optical properties to determine their usage in different application scenarios. In some aspects, the method 200 may be executed on the hybrid PVT system 100 depicted in either of FIG. 1A or FIG. 1B.

In some aspects of the method 200, the CF channel 106 is provided with the plurality of fins 106P and passages 106Q.

In some aspects of the method 200, the sidewalls 104D, 104E of the OF channel 104 and the sidewalls 106D, 106E of the CF channel 106 are insulated. In some aspects, the insulation may be facilitated by the upright walls 128 of the first coupling unit 124A.

In some aspects of the method 200, the hybrid PVT system 100 includes the OF fluid loop 110, the CF loop 116, the OF tank 112 for holding the OF fluid, the first pump 115 configured for pumping the OF fluid, the CF tank 118 for holding the cooling fluid, a second pump 119 configured for pumping the cooling fluid, the OF heat exchanger 114 for the OF fluid, and the CF heat exchanger 120 for the cooling fluid.

In some aspects of the method 200, the hybrid PVT system 100 includes the OF fluid loop 110, the CF loop 116, the OF tank 112 for holding the OF fluid, the CF tank 118 for holding the cooling fluid, the composite heat exchanger 122 configured to cool the OF fluid and the cooling fluid, the first pump 115 configured for pumping the OF fluid and the second pump 119 configured for pumping the cooling fluid.

In some aspects of the method 200, the inlet 104H and the outlet 104I of the OF channel 104 are connected to the OF fluid loop 110. In some aspects, such a connection is facilitated by the first connector 104A and the second connector 104B.

In some aspects of the method 200, the inlet 106H and the outlet 106I of the CF channel 106 are connected to the CF loop 116. In some aspects, such a connection is facilitated by the first connector 106A and the second connector 106B.

In some aspects of the method 200, the OF fluid in the OF fluid loop 110 passes through the OF tank 112, the OF channel 104, and the OF heat exchanger 114 in sequence.

In some aspects of the method 200, the cooling fluid in the CF loop 116 passes through the CF tank 118, the CF channel 106, and the CF heat exchanger 120 in sequence.

In some aspects of the method 200, the OF heat exchanger 114 and the CF heat exchanger 120 are integrated into one integrated heat exchanger 122 (as seen in FIG. 1B) which allows for heat rejection from the OF fluid and the cooling fluid through the OF fluid loop 110 and the CF loop 116, respectively.

In some aspects of the method 200, heights of the OF channel 104 and the CF channel 106 are 1 cm and 2 cm, respectively.

An advantageous aspect of the hybrid PVT system 100 and the method 200 of the present disclosure is the application of the optical filtration using a moving OF fluid in a full-scale expandable experimental setup. Another advantageous aspect of the hybrid PVT system 100 and the method 200 of the present disclosure is that it helps in enhancing the thermal and/or electrical efficiency of the hybrid PVT systems 100 depending on the order of fixation of the components.

The modular and flexible design of the hybrid PVT system 100 and the method 200 of the present disclosure facilitate the optimization of a suitable arrangement of the components of the hybrid PVT system 100, as the hybrid PVT system 100 can be, easily, converted into three systems at least as shown in FIGS. 9A through 9C. More specifically, using the CF channel 106 only below the PV panel 102 allows studying the cooling from the bottom side of the PV panel 102 using different fluids and operating conditions. Using the CF channel 106 below the PV panel 102 with the PCM layer 108 in-between allows studying the effect of the cooling and the thermal regulation of the PV panel 102 on the performance of the hybrid PVT system 100. Further, using the OF channel only above the PV panel 102 allows for testing and optimizing the cooling and optical filtration from the upper side of the PV panel 102 by using different fluids and operating conditions. Using the OF channel 104 only above the PV panel 102 with an airgap in-between allows the testing, separately, the optical filtration effect of the fluid/nanofluid flowing through the OF channel 104 and the effect of the height of the OF channel 104 on the performance of the hybrid PVT system 100. Using the CF channel 106 below the PV panel 102 and the OF channel 104 above the PV panel 102 facilitates the control of the cooling effect on both the sides of the PV panel 102, in addition to the optical filtration effect on the performance of the hybrid PVT system 100. Using the CF channel 106 below the PV panel 102 with the PCM layer 108 in-between and the OF channel 104 above the PV panel 102 allows monitoring the temperature from both sides of the panel with thermal regulation of the performance of the hybrid PVT system 100.

With two different sizes for the OF channel 104 and the CF channel 106, and as the two channels can work on behalf of each other, six different experimental arrangements were obtained. For example, for the OF channel height of 1 cm and the CF channel height of 2 cm, the available arrangements were:

PV+OF channel (height=1 cm)
PV+CF channel (height=2 cm)
PV+OF channel (height=2 cm)
PV+CF channel (height=1 cm)
PV+OF channel (height=1 cm)+CF channel (height=2 cm)
PV+OF channel (height=2 cm)+CF channel (height=1 cm)

In the experimental apparatus of the hybrid PVT system 100, the effect of the direction of the flowing fluids on the upper and lower sides of the PV panel 102 was tested (parallel and counter flows). The flexibility of the hybrid PVT system 100 allowed for the trials of different fluids and the PCM layers 108 for assessment of their effect on the performance of the hybrid PVT system 100.

According to the present disclosure, the OF channel 104 and the CF channel 106 may be easily modified and fixed to the hybrid PVT system 100 to study the effect of different parameters (e.g. channel design, passages design, channel height, etc.). Further, with simple modifications in the base sections 123 of the hybrid PVT system 100, different angles or orientations of the hybrid PVT system 100 can be obtained, which may facilitate targeting the solar radiation at different times and locations.

Obviously, numerous modifications and variations of the present disclosure are possible in light of the above teachings. It is therefore to be understood that within the scope of the appended claims, the invention may be practiced otherwise than as specifically described herein.

What is claimed is:

1. A hybrid photovoltaic thermal (PVT) system, comprising:
   a photovoltaic (PV) panel;
   an optical filtration (OF) channel located above the PV panel, wherein the OF channel contains an OF fluid configured to transmit a first spectrum of solar radiation that is within a predefined spectral range and absorb a remaining, second spectrum of the solar radiation that is outside the predefined spectral range;
   wherein the OF fluid contains water which contains nanoparticles selected from the group consisting of platinum nanoparticles and a combination of gold nanospheres and nanorods and indium tin oxide (ITO) nanocrystals,
   a cooling fluid (CF) channel located below the PV panel, wherein the CF channel contains a cooling fluid,
   wherein the cooling fluid is one of polypropylene glycol and polydimethyl siloxane based oil which contains nanoparticles suspended in the cooling fluid, wherein the nanoparticles in the cooling fluid are selected from the group consisting of indium tin oxide and gold nanospheres; and
   a phase change material (PCM) layer inserted between the PV panel and the CF channel, wherein the PCM layer contains graphene nanoplatelets in a concentration greater than or equal to 10 wt. % of the total weight of the PCM layer.

2. The hybrid PVT system of claim 1, wherein the CF channel includes a plurality of fins and passages.

3. The hybrid PVT system of claim 1, wherein each of the CF channel and the OF channel is configured with sidewalls, wherein the sidewalls are insulated.

4. The hybrid PVT system of claim 2, wherein a height of the sidewalls of the OF channel and a height of the sidewalls of the CF channel are 1 cm and 2 cm, respectively.

5. The hybrid PVT system of claim 1, further comprising an OF fluid loop, a CF loop, an OF tank for the OF fluid, a CF tank for the cooling fluid, an OF heat exchanger configured to cool the OF fluid, a first pump configured to pump the OF fluid and a second pump configured to pump the cooling fluid, and a CF heat exchanger configured to cool the cooling fluid.

6. The hybrid PVT system of claim 5, wherein:
   the OF fluid loop includes a first plurality of flexible hoses configured to connect the OF tank and the OF heat exchanger to an inlet and an outlet of the OF channel, and
   the CF fluid loop includes a second plurality of flexible hoses configured to connect the CF tank and the CF heat exchanger to an inlet and an outlet of the CF channel.

7. The hybrid PVT system of claim 6, wherein:
   the OF fluid in the OF fluid loop passes through the OF tank, the OF channel, and the OF heat exchanger in sequence; and
   the cooling fluid in the CF loop passes through the CF tank, the CF channel, and the CF heat exchanger in sequence.

* * * * *